US006934044B1

(12) United States Patent
Khandelwal

(10) Patent No.: US 6,934,044 B1
(45) Date of Patent: Aug. 23, 2005

(54) TECHNIQUE FOR VERIFYING PRINT JOB FORMATTING FOR NETWORK PRINTING

(75) Inventor: Pankaj Khandelwal, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 929 days.

(21) Appl. No.: 09/651,911

(22) Filed: Aug. 30, 2000

(51) Int. Cl.[7] ........................... G06F 3/12; G06F 13/00
(52) U.S. Cl. .................... 358/1.15; 358/1.14; 358/1.13
(58) Field of Search ............................. 358/1.15, 1.14, 358/1.17, 1.18, 1.13, 1.6, 3.28, 3.27, 504, 358/501, 530, 539, 401

(56) References Cited

U.S. PATENT DOCUMENTS

| | | | |
|---|---|---|---|
| 5,625,757 A | 4/1997 | Kageyama et al. | 395/113 |
| 5,740,028 A | 4/1998 | Sugiyama et al. | 364/130 |
| 5,768,483 A | 6/1998 | Maniwa et al. | 395/114 |
| 5,880,447 A * | 3/1999 | Okada et al. | 235/380 |
| 6,292,267 B1 * | 9/2001 | Mori et al. | 358/1.15 |
| 6,678,066 B1 * | 1/2004 | Nakamura | 358/1.13 |

OTHER PUBLICATIONS http://www.physics.mun.ca/MUNPhys/UNIX/Resources/Editors/Postscript.html; "The PostScript Language"; Jun. 27, 1995; 2 pages.
http://www.cs.indiana.edu/docproject/programming/postscript/what-is-it.html; "What is PostScript?"; Dec. 21, 1996; 1 page.
http://www.cs.indiana.edu/docproject/programming/postscript/graphics.html; "Graphics Concepts"; 1 page.
http://www.cs.indiana.edu/docproject/programming/postscript/clipping.html; "Clipping for Effect"; Dec. 21, 1996; 2 pages.
http://www.cs.indiana.edu/docproject/programming/postscript/transforms.html; "Transformations"; Dec. 21, 1996; 3 pages.
http://www.cs.indiana.edu/docproject/programming/postscript/text.html; "Putting Text on the Page"; Dec. 21, 1996; 2 pages.
http://www.cs.indiana.edu/docproject/programming/postscript/language.html; "Lanuage Concepts"; Dec. 21, 1996; 2 pages.
http://www.cs.indiana.edu/docproject/programming/postscript/programming.html; "Programming in Postscript"; Dec. 21, 1996; 1 page.
http://www-cdf.fnal.gov/offline/Postscript/AdobePS.html; "How to use Adobe Postscript language files properly."; Jun. 24, 1999; 12 pages.

* cited by examiner

Primary Examiner—Douglas Tran
(74) Attorney, Agent, or Firm—Osha Liang LLP

(57) ABSTRACT

An apparatus is disclosed for improved network printing including a plurality of client machines connected by a network, a printer connected to the network by a network interface controller, a printer server connected to the printer, a printer controller connected to the printer, and a header analyzer embedded into a memory of the printer controller. A method is also disclosed of improved networked printing using a header analyzer in a networked component to monitor and repair incoming print jobs, and outputting the repaired print jobs to a printer. Also disclosed is an apparatus for improved networked printing that includes a plurality of client machines connected by a network, a printer connected to the network by a network interface controller, a printer server connected to the printer, a printer controller connected to the printer, and a filter embedded into a memory of each of the plurality of workstations. Additionally disclosed is a method for improved network printing that includes using a filter embedded in each of a plurality of client machines to filter a print job prepared by each of the plurality of client machines, and printing the print job on a printer.

16 Claims, 5 Drawing Sheets

TECHNIQUE FOR VERIFYING PRINT JOB FORMATTING FOR NETWORK PRINTING

BACKGROUND OF THE INVENTION

When a printer receives a print job from a networked computer, a printer controller associated with the printer typically processes the incoming print job as a special type of file known as PostScript. The controller then decodes the file and outputs the print job to the printer. PostScript is a device-independent page description language developed by Adobe Systems Incorporated. Because the language is device independent, an image may be described without reference to any specific device features (e.g. printer resolution) so that the same description can be used on any printer capable of reading PostScript files.

If the printer does not identify a print job as being a PostScript file, the printer typically will assume that the print job is an ASCII file and will print the ASCII equivalent of the characters from the print job. If the file is not an ASCII file, however, this assumption results in pages of unrecognizable symbols and phrases being printed. Special file formats (e.g., files with extensions such as .gif and .jpg) must, therefore, contain programming to convert such files into PostScript language so that such files can be properly printed.

When a file is sent to the printer (a print job), the print job typically contains a header that includes a description of the format. However, when a user submits a specific type of command, such as a line print command (in UNIX, for example, the commands lp or lpr) the header may not be included, and printing errors may result. The print job may not contain a specific separate sections to describe the file format, but somewhere within the file itself is a description of the file format. Throughout this application, when the term "header" is used, it should be recognized that the term is used to relate to any information regarding file format.

In such networked systems, each personal computer does not need its own dedicated printer, thus reducing the system cost. A print server receives print jobs from a plurality of networked computers and coordinates the distribution of the print jobs to a number of printers. A typical network printing system is shown in FIG. 1. The network printing system includes a printer 2 as a printing device for outputting an image to paper. A network interface controller 3 is provided to connect the printer 2 to a network 4. The network 4 may be either a local (LAN) or a wide (WAN) area network. A printer controller 5 converts a received print job from the network interface controller 3 to printable image data and outputs the converted print job to the printer 2. A plurality of workstations 1, often referred to as "client machines", each connected to the network 4, and a printer server 7 are also included. The printer server 7 connects the printer 2 and printer controller 5 to the plurality of workstations 1 through the network 4 and the network interface controller 3. In this configuration, the network printing system uses the printer 2 as a shared network resource for use by each of the plurality of workstations 1.

When a user of one of the workstations 1 wants to print a document, the user specifies a document to be printed, sets the appropriate printing conditions (e.g., orientation, number of pages) and instructs the workstation 1 to generate a print job. When the print job is transferred to the printer server 7 through the network 4, the print job is placed in a queue by a print queue function of the printer server 7. The printer server 7 typically queues the print jobs based on the order in which they were received. The printer server 7 then transfers the print job that is in the first queue position to the printer controller 5 through the network 4 and network interface controller 3. The printer controller 5 converts the print job to printable image data, outputs the data to the printer 2 and controls the printer 2. The result is typically the formation of an image or document text on paper.

SUMMARY OF THE INVENTION

One aspect of the invention relates to an apparatus for improved network printing including a plurality of client machines connected by a network, a printer connected to the network by a network interface controller, a printer server connected to the printer, a printer controller connected to the printer, and a header analyzer embedded into a memory of the printer controller.

In one aspect, the invention relates to a method for improved networked printing that includes monitoring and repairing incoming print jobs in a header analyzer embedded in the printer controller, and outputting the repaired print jobs to a printer in a header analyzer.

In one aspect, the invention relates to an apparatus for improved networked printing that includes a plurality of client machines connected by a network, a printer connected to the network by a network interface controller, a printer server connected to the printer, a printer controller connected to the printer, and a filter embedded into a memory of each of the plurality of client machines.

In one aspect, the invention relates to a method for improved network printing that includes filtering a print job prepared by each of the plurality of client machines in a filter embedded in the plurality of client machines, and printing each print job on a printer.

In one aspect, the invention relates to an apparatus for improved network printing that includes a plurality of client machines connected by a network, a printer connected to the network by a network interface controller, a printer server connected to the printer, a printer controller connected to the printer, and filter embedded in the memory of a networked component.

Other aspects and advantages of the invention will be apparent from the following description and the appended claims.

DETAILED DESCRIPTION OF THE INVENTION

Computer users would like to avoid printing errors and ASCII default printing because such errors waste paper and time. The present invention allows a user to reduce these types of errors in printing.

Figure 1:
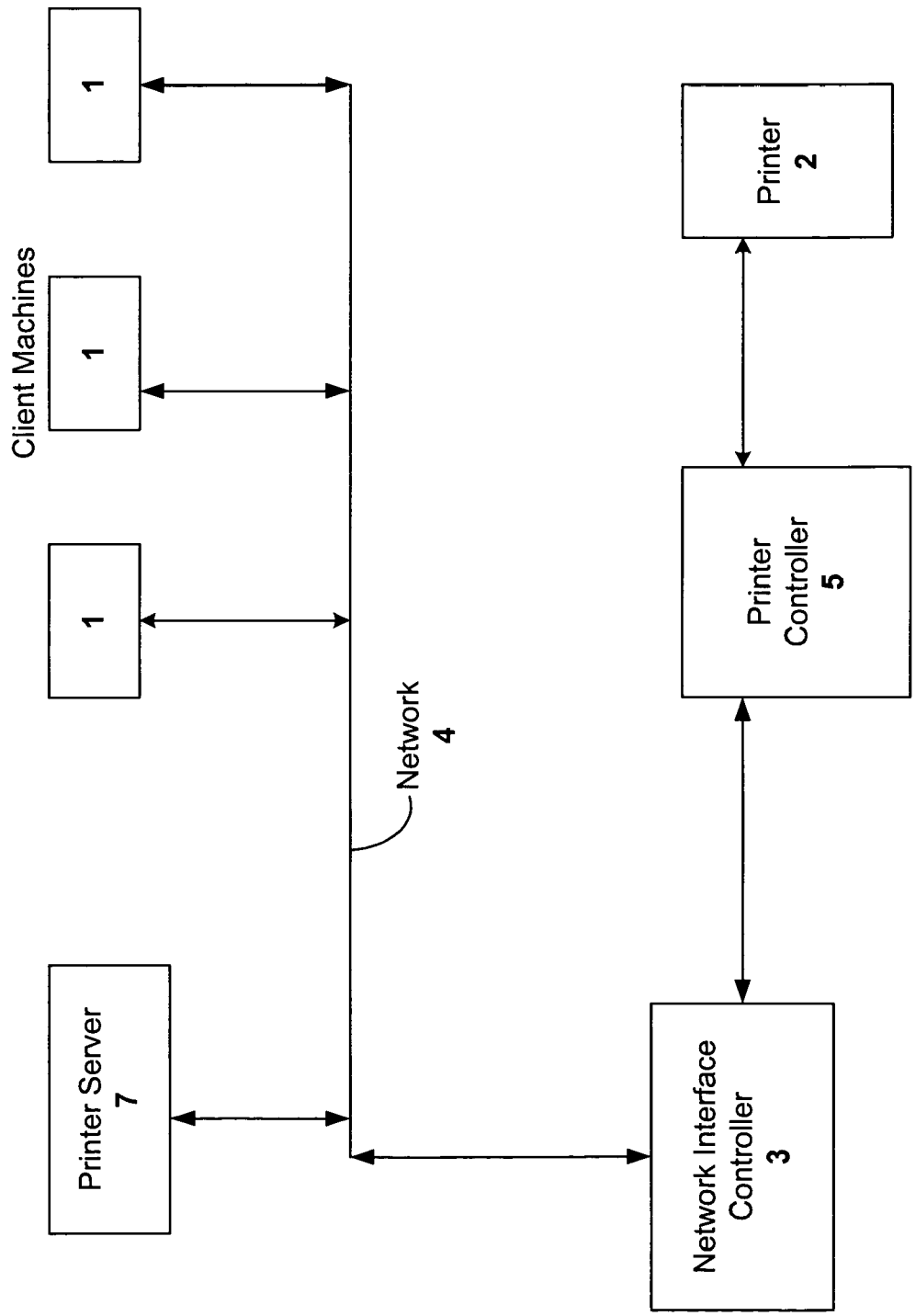
FIG. 1 is a prior art networked printer system.
Figure 2:
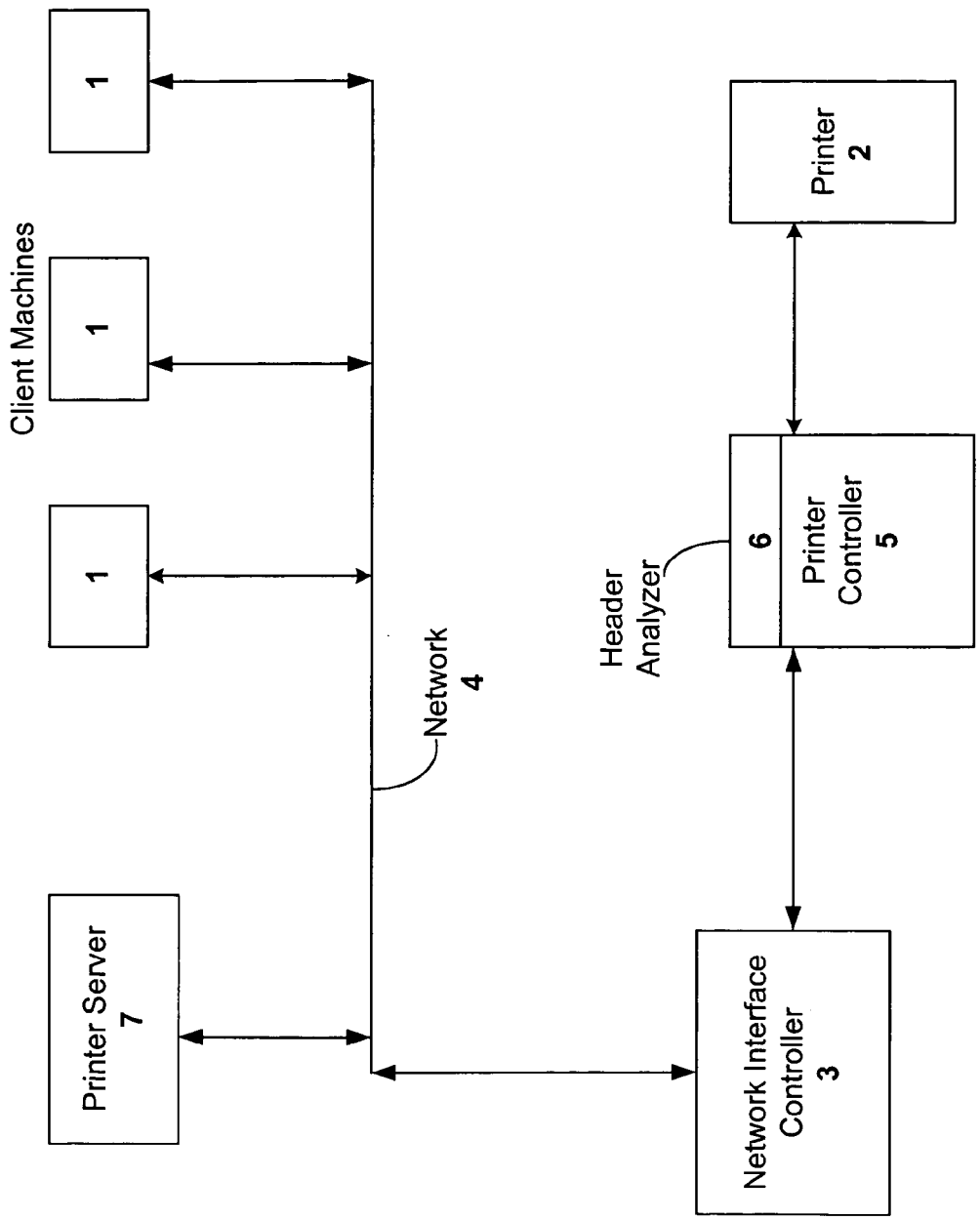
FIG. 2 is a schematic diagram in accordance with one embodiment of the present invention.

In FIG. 2, a plurality of client machines 1 are connected to a networked printer 2. A suitable client machine can be any networked computer system. For example, a plurality of networked workstations (i.e., computers lacking individual CPU's), or a plurality of networked PC's. A network interface controller 3 connects the printer 2 to a network 4 through a printer controller 5, which converts data sent from the network interface controller 3 to printable image data and outputs the converted print data to the printer 2. A header analyzer 6 located in a memory of the printer controller 5 checks and fixes errors associated with the header of a print job. Once again, the term header is used to describe any information relating to the description of the file format. Not all print jobs will have specific headers, but all jobs will have information about the file format. The header analyzer 6 reviews the incoming print job and determines whether the incoming print job is a PostScript print job. If the print job is improperly formated, or is missing header information, the header analyzer 6 fixes the print job and outputs the fixed print job to the printer. Missing information may include, for example, any color information required for printing a color document. The header analyzer 6 may be incorporated into a resident memory on the printer controller 5.

Figure 3:
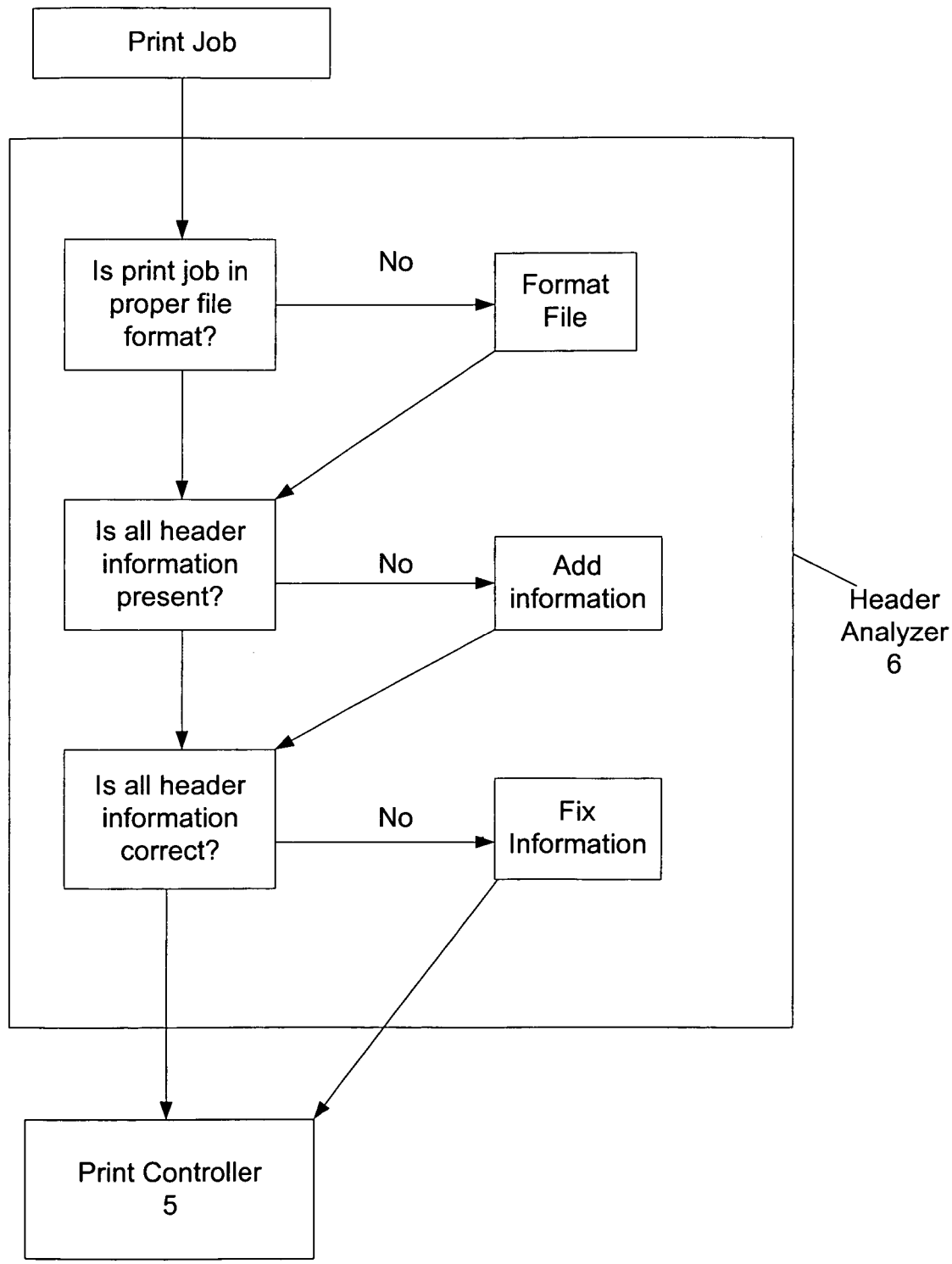
FIG. 3 is a flow chart illustrating a method in accordance with one embodiment of the present invention.

In this embodiment, if a user at one of the plurality of client machines 1 wishes to print a document, the user enters a line print command and generates a print job. The print job is transferred to the printer server 7 through the network 4, and the print job is placed in a queue by a print queue function of the printer server 7. The printer server 7 then transfers the print job that is first in queue to the printer controller 5 through the network 4 and network interface controller 3. The header analyzer 6 checks and fixes the print job. The printer controller 5 then converts the fixed print job to printable image data, and outputs the fixed print job to the printer 2. The printer 2 then produces an image on paper. FIG. 3 illustrates a logical pathway of the header analyzer 6. In FIG. 3, a flow chart illustrates the logical steps of the header analyzer 6. A print job enters into the header analyzer 6 where a header checked to see if all necessary information is present. If the information is not present, the header analyzer 6 can add the required information. The header analyzer 6 checks to see if all of the header information is correct. If it is not, the header analyzer 6 can either halt printing and inform a user, or it can fix the header info. The checked and fixed print job may then be sent to the print controller 5. As an example, a file "photo.gif" is transmitted file a line print command to the header analyzer 6, which recognizes that the file has a format other than PostScript. The header analyzer 6, then either halts printing or converts the file.

Although the above has been described with reference to an exemplary embodiment, the description of the individual components is not intended to limit the scope of the invention. Different types of networks may be used, for example, rather than using the plurality of client machines 1 a networked system of PC's may be used. Other types of networks are possible as well such as an ethernet-based network. In larger systems, multiple printers may be used, rather than the single printer shown here. Other types of printers rather than PostScript printers may be used. Additionally, other components may be present in the system, such as networked scanners, copiers, etc.

Figure 4:
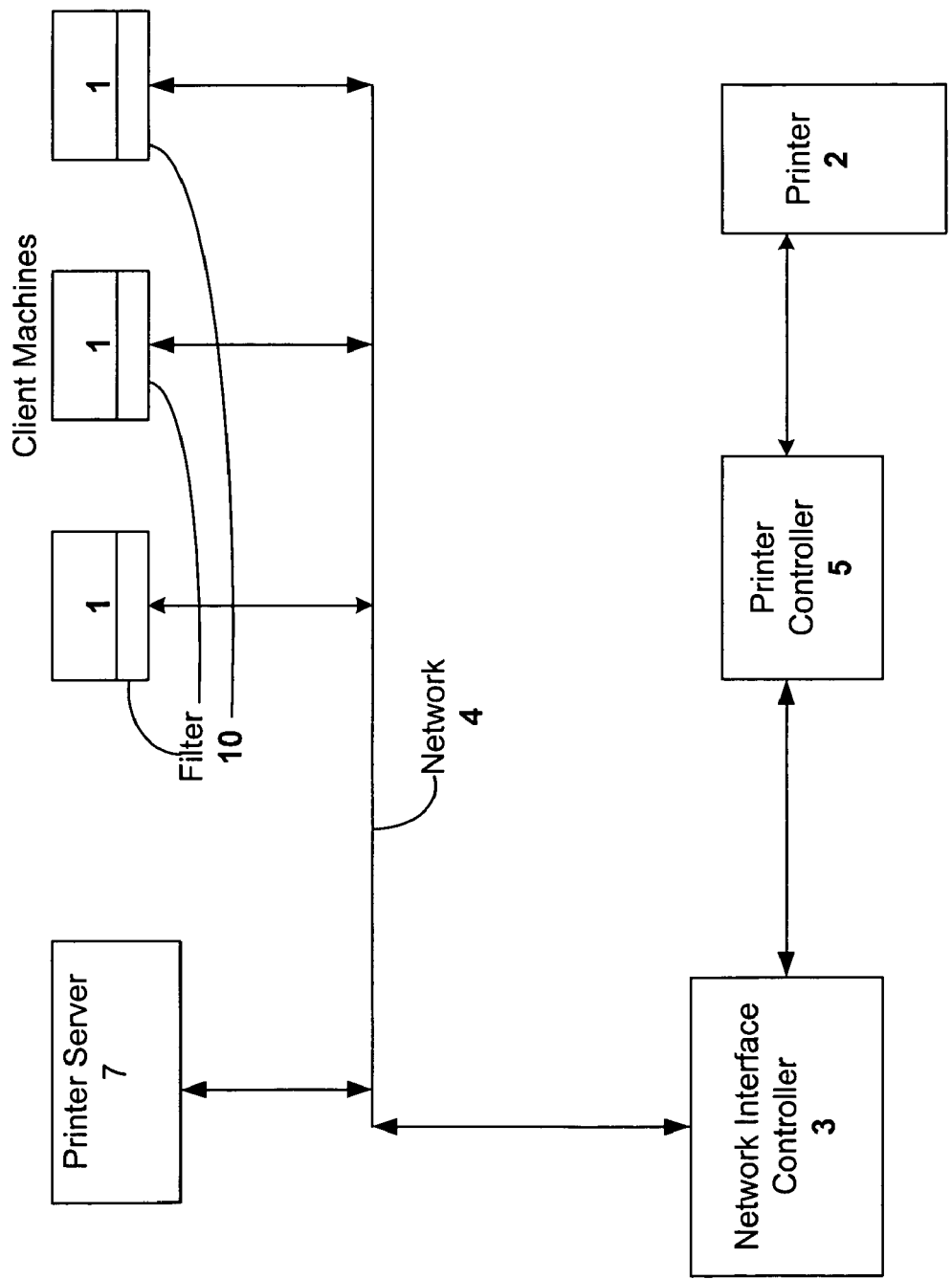
FIG. 4 is a schematic diagram in accordance with one embodiment of the present invention.
Figure 5:
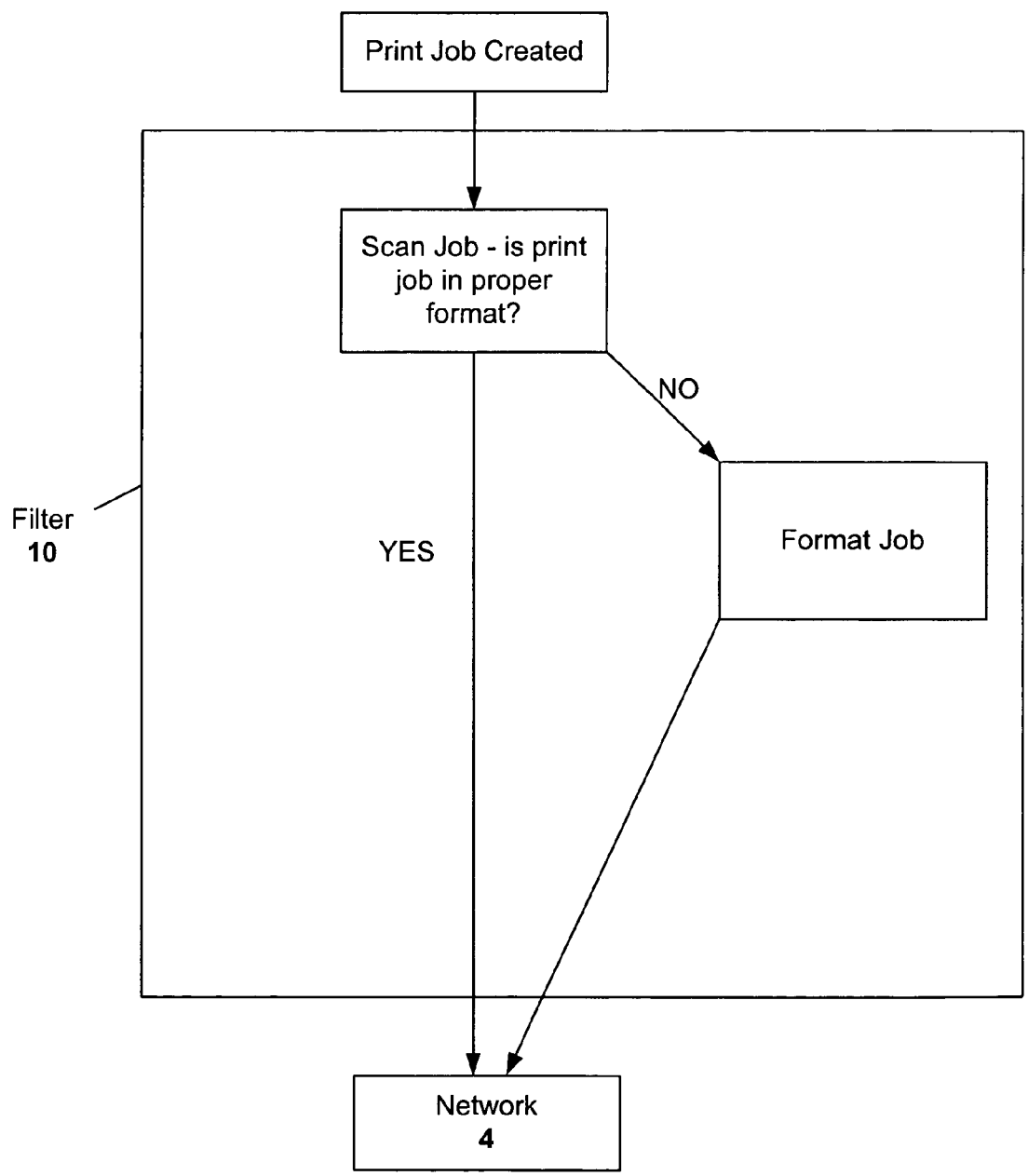
FIG. 5 is a flow chart illustrating a method in accordance with one embodiment of the present invention.

FIG. 4 illustrates another embodiment in accordance with the invention. In FIG. 4, a filter 10 is embedded in a resident memory (not shown) of each of a plurality of client machines 1. The plurality of client machines 1 are networked to a printer 2 in a similar configuration to that described in the above embodiment. Also included are a network interface controller 3, a printer controller 5, and a printer server 7 connected by a network 4. The filter 10 converts all non-ASCII outgoing print jobs into PostScript language in the proper format to ensure error free printing. The filter 10 operates by reviewing an outgoing stream of data and converting the stream into a print job in a PostScript format, if necessary. Because PostScript is a language, the filter 10 functions in a manner similar to a compiler (such as a compiler in Pascal or C++, for example). However, the filter 10 not only determines whether the outgoing stream of data is in proper format, but is able to "fix" any errors therein. This allows a properly formatted file to be sent to the printer 2, as described above, which results in fewer printer errors. The above embodiment is referenced to a PostScript printer, but other types of printers may be used. FIG. 5 illustrates a logical overview of the filter 10. In FIG. 5, the logical steps performed by the filter 10 are shown. The filter 10 scans an incoming print job and determines whether the print job is in the proper format. If the print job is not in the proper format, the filter 10 formats the print job and sends the formatted print job to the network 4. In a typical example, a user wishes to print a file "photo.gif", and issues a print command. The file is then sent to the filter 10 which examines the file. If the filter 10 determines that the file has an extension other than PostScript (in this embodiment), the filter 10 opens a utility program, stores the file into the utility program, and then the utility program converts the file to the proper format. The file is then transmitted to the network, where it eventually is printed.

This invention supplies a low cost, easy to implement method and apparatus for reducing printing errors in network printing systems. This allows a reduction in wasted time as well as reducing waste paper.

Those skilled in the art will appreciate that other embodiments of the invention can be devised which do not depart from the spirit of the invention as disclosed herein. For example, the header analyzer 6 may be incorporated into the network interface controller 3, the printer 2, or the printer server 7 (i.e., any networked component, other than the plurality of client machines 1). Additionally, the invention should not be limited to PostScript printers. Any preselected file format may be used, regardless of type. Accordingly, the scope of the invention should be limited only by the attached claims.

What is claimed is:

1. A method of networked printing comprising:
   monitoring and repairing an incoming print job from one of a plurality of client machines connected to a network in a component operatively connected to the network, wherein the monitoring and repairing comprises:
   determining whether the print job is formatted in a language recognizable by a printer, and
   if the print job is not formatted in the language recognizable by the printer, selectively converting a language of the print job into the language recognizable by the printer; and
   outputting the repaired print job to the printer.

2. The method of claim 1, wherein the component comprises a header analyzer embedded in a memory of a printer controller.

3. The method of claim 1, wherein the component comprises a filter embedded in at least one of the plurality of client machines.

4. An apparatus for network printing, comprising:
   a plurality of client machines connected to a network and capable of generating at least one print job;
   a printer connected to the network by a network interface controller;
   a printer server connected to the printer; and
   a printer controller connected to the network; and a component operatively connected to the network and arranged to selectively convert a language of the print job to a language recognizable by the printer dependent on whether the print job is previously formatted in the language recognizable by the printer.

5. The apparatus of claim 4, wherein the component comprises the printer.

6. The apparatus of claim 4, wherein the component comprises the printer server.

7. The apparatus of claim 4, wherein the component comprises the printer controller.

8. The apparatus of claim 4, wherein the component comprises a filter embedded into a memory of at least one of the plurality of client machines.

9. The apparatus of claim 8, wherein the filter is adapted to check for any errors preventing proper printing in a print job before the print job is outputted to the network.

10. The apparatus of claim 8, wherein the filter is adapted to fix any errors preventing proper printing in a print job before the print job is outputted to the network.

11. The apparatus of claim 4, wherein the component comprises a header analyzer.

12. The apparatus of claim 11, wherein the header analyzer is embedded in a memory of the printer controller.

13. The apparatus of claim 11, wherein the header analyzer is adapted to check for any errors preventing proper printing in a print job transferred from the network interface controller.

14. The apparatus of claim 11, wherein the header analyzer is adapted to fix any errors preventing proper printing in a print job transferred from the network interface controller.

15. The apparatus of claim 4, wherein the network comprises a Local Area Network.

16. The apparatus of claim 4, wherein the network comprises a Wide Area Network.

* * * * *